(12) United States Patent
See et al.

(10) Patent No.: US 9,626,812 B2
(45) Date of Patent: Apr. 18, 2017

(54) SCR AFTERTREATMENT SYSTEM MAINTENANCE INDUCEMENT METHOD

(71) Applicant: Cummins Inc., Columbus, IN (US)

(72) Inventors: Tung-King See, Columbus, IN (US); W. Patrick Niehus, Columbus, IN (US); Brett D. Griffith, Greenwood, IN (US)

(73) Assignee: Cummins Inc., Columbus, IN (US)

(*) Notice: Subject to any disclaimer, the term of this patent is extended or adjusted under 35 U.S.C. 154(b) by 119 days.

(21) Appl. No.: 14/560,355

(22) Filed: Dec. 4, 2014

(65) Prior Publication Data

US 2015/0088362 A1 Mar. 26, 2015

Related U.S. Application Data

(63) Continuation of application No. PCT/US2013/044227, filed on Jun. 5, 2013.

(60) Provisional application No. 61/656,528, filed on Jun. 7, 2012.

(51) Int. Cl.
| | |
|---|---|
| *F01N 3/10* | (2006.01) |
| *G07C 5/08* | (2006.01) |
| *F01N 3/20* | (2006.01) |
| *F01N 11/00* | (2006.01) |

(52) U.S. Cl.
CPC ........... *G07C 5/0808* (2013.01); *F01N 3/208* (2013.01); *F01N 11/00* (2013.01); *G07C 5/0825* (2013.01); *F01N 2550/02* (2013.01); *F01N 2550/05* (2013.01); *F01N 2570/14* (2013.01); *F01N 2610/02* (2013.01); *F01N 2610/1406* (2013.01); *F01N 2900/1814* (2013.01);

(Continued)

(58) Field of Classification Search
USPC .................. 60/274, 286, 295, 297, 301, 303
See application file for complete search history.

(56) References Cited

U.S. PATENT DOCUMENTS 6,063,350 A * 5/2000 Tarabulski ............. B01D 53/90
423/212
6,363,771 B1 4/2002 Liang et al.
(Continued)

OTHER PUBLICATIONS

PCT/US2013/044227, International Search Report and Written Opinion, Sep. 30, 2013, 10 pages.
(Continued)

*Primary Examiner* — Binh Q Tran
(74) *Attorney, Agent, or Firm* — Taft Stettinius & Hollister LLP (57) ABSTRACT

Systems and methods are disclosed that relate to an SCR aftertreatment system and incentives/inducements for an operator/user to maintain the SCR aftertreatment in compliance with operating requirements and/or regulations. An engine is operationally coupled to at least one of a DEF tank and an SCR aftertreatment system. An inducement signal value is determined in response to a threshold value being obtained relating to at least one of the DEF tank level indication, a DEF quality indication, and an SCR aftertreatment system malfunction indication. The inducement signal value initiates at least one derate value of the engine to incentivize or induce the operator to have the aftertreatment system maintained and avoid or prevent out-of compliance operation of the SCR aftertreatment system.

38 Claims, 5 Drawing Sheets

(52) U.S. Cl.
CPC ....... *F01N 2900/1818* (2013.01); *Y02T 10/24* (2013.01); *Y02T 10/47* (2013.01)

(56) References Cited

U.S. PATENT DOCUMENTS

| | | | |
|---|---|---|---|
| 8,069,649 B2* | 12/2011 | Matsunaga | F01N 13/009 60/277 |
| 9,188,042 B2* | 11/2015 | Takahashi | F01N 3/2066 |
| 9,228,474 B2* | 1/2016 | Jung | B60W 50/00 |
| 9,239,320 B2* | 1/2016 | Klenk | G01N 33/00 |
| 9,266,709 B2* | 2/2016 | Brammell | B67D 7/02 |
| 2010/0083636 A1 | 4/2010 | Wang et al. | |
| 2010/0115925 A1 | 5/2010 | Charbonneau | |
| 2010/0180576 A1 | 7/2010 | Wang et al. | |
| 2010/0312445 A1 | 12/2010 | Bogema et al. | |
| 2011/0146240 A1 | 6/2011 | Wilhelm et al. | |
| 2012/0078487 A1 | 3/2012 | Light-Holets | |

OTHER PUBLICATIONS

California Enviornmental Protection Agency, Selective Catalytic Reduction Workshop, Jul. 20, 2010, 36 pages.

\* cited by examiner

| Inducement | Derate Type | Default Value from Advertised (Rated) Curve |
|---|---|---|
| Initial (and/or) | Torque | ≥ 25% |
| | Speed | ≥ 25% (optional) |
| Secondary (and) | Torque | ≥ 50% |
| | Speed | ≥ 40% |
| Final | Idle | Default |
| | Shut down | Optional |
| | Restart Limitation | Optional |

SCR AFTERTREATMENT SYSTEM MAINTENANCE INDUCEMENT METHOD

CROSS-REFERENCE TO RELATED APPLICATION

The present application is a continuation of International Application No. PCT/US2013/044227 filed on Jun. 5, 2013, which claims priority to and the benefit of the filing date of U.S. Provisional Application Ser. No. 61/656,528, filed on Jun. 7, 2012, each of which is incorporated herein by reference.

BACKGROUND

Selective catalytic reduction (SCR) has been widely used in diesel engine applications as an emission-reduction technology with the ability to deliver reduced emissions of nitrogen oxides ($NO_x$). SCR uses a basic chemistry reaction to reduce $NO_x$ emissions by using hot exhaust, diesel exhaust fluid (e.g. a urea-water solution) and a catalytic converter. Vaporized diesel exhaust fluid (DEF) and hot exhaust gases enter a catalytic converter located in the exhaust system after the diesel particulate filter. When the DEF is injected into the hot exhaust stream and comes into contact with the SCR catalyst, the ammonia created from the urea reacts with $NO_x$ to form nitrogen and water vapor. If the DEF supply fails (e.g. an empty tank), the DEF quality is poor (e.g. an off-nominal DEF supply and/or dilution event), and/or if the SCR system is subjected to malfunction through tampering or component failure or defect, the SCR $NO_x$ conversion can degrade or fail to convert an acceptable amount of $NO_x$. While $NO_x$ conversion may be degraded or failed, engine operations may otherwise be performing normally (e.g. achieving torque, power, speed, and/or fuel efficiency target values).

A system for incentivizing an operator to correct an SCR maintenance or compliance issue is known for on-road applications. Due to the similarity in operating conditions and accessibility to infrastructure for on-road applications, presently known incentive structures include utilizing a fixed derate type and severity. Furthermore, on-road applications have vehicle sensors that can be used to delay incentive derates until the vehicle speed is below certain threshold. However, certain vehicles and applications lack speed sensors, and SCR aftertreatment systems are employed in a wide variety of off-road and non-vehicular applications. Thus, a fixed derate type of incentive employed for on-road vehicles may provide unsatisfactory results, particularly in other applications. Therefore, there remains a need for additional developments in this technology area.

SUMMARY

Systems and methods are disclosed that relate to an internal combustion engine having an SCR aftertreatment system, and incentives/inducements for an operator/user to maintain the SCR aftertreatment system in compliance with operating requirements and/or regulations. The systems and methods include an engine operationally coupled to at least one of a DEF tank and an SCR aftertreatment system. An inducement signal value is determined in response to a threshold value being reached by at least one of a DEF tank level indication, a poor DEF quality indication, and an SCR system malfunction indication. A derate value for the engine is determined in response to the inducement signal value to incentivize or induce the operator to have the aftertreatment system maintained and avoid or prevent out-of-compliance operation of the SCR aftertreatment system.

These and other aspects, embodiments, features, and forms of the systems and methods are discussed further below.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
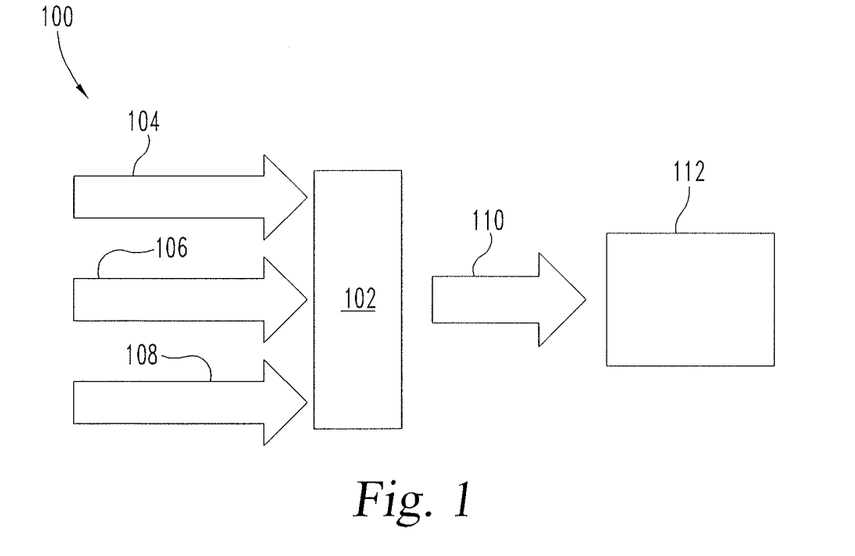
FIG. 1 is a schematic of a system for inducing maintenance of an SCR aftertreatment system of an internal combustion engine.

Referencing FIG. 1, a system 100 is shown schematically for incentivizing or inducing maintenance of an SCR aftertreatment system. Inducing or induce, as used herein, includes any operations or strategy that provide a response other than nominal engine operation relative to a low or inadequate DEF level indication, a poor DEF quality indication, SCR aftertreatment system malfunction indication, and/or other SCR system fault. Inducing, inducement and induce may additionally or alternatively be described as incentivizing, incentive, and incent.

The system 100 includes an electronic control module (ECM) 102 that determines an inducement signal value 110 in response to one or more of a DEF tank level indication 104, a DEF quality indication 106, and/or an SCR aftertreatment system malfunction indication 108. The DEF tank level indication 104 includes a low tank level and/or an empty tank level, and may be generated by any means known in the art, such as a tank level sensor. The DEF quality indication 106 includes a degraded urea fluid quality, a failed urea fluid quality, or any other indication that DEF quality is poor and below standards for use in aftertreatment system operation. The DEF fluid quality may be determined by any means known in the art, including at least utilizing a sensor that detects some characteristic of the fluid that correlates to DEF quality, by determining that the SCR catalyst $NO_x$ conversion has been reduced and determining that the SCR catalyst is eliminated (or has a reduced chance) as a cause, and/or by determining that another controller (not shown) has set a fault code indicating a poor DEF quality is present. The aftertreatment system malfunction indication 108 includes any system indicator that correlates to a tampered, failed, and/or improperly functioning component(s) of the SCR aftertreatment system, including an electrical fault, a rationality check of a sensor, a fault code set by another controller (not shown), or any other type of system malfunction.

The ECM 102 may be a portion of a processing subsystem, and may be included within a single hardware device or distributed throughout two or more hardware devices. The ECM 102 provides the inducement signal value 110, and a component of the system 100 provides an engine derate value 112 in response to the inducement signal value 110. The inducement signal value 110 may be qualitative or quantitative value that provides the engine derate value 112, such as a flag indicating that the inducement should be commenced, a percentage value or offset value utilized to derate the engine (e.g. 10% torque reduction, −200 RPM speed rating limit), and/or an engine state that should be entered (e.g. TORQUE DERATE 1; IDLE; etc.). The inducement signal value 110 may provide the derate value directly. For example, the inducement signal value 110 may be a value such as a torque command that directly reflects the engine derate value 112, and/or the inducement signal value 110 may be a value that is interpreted by a portion of the system 100, and based upon the inducement signal value 110 the engine derate value 112 is determined and applied. The engine derate value 112 may be subject to delay timers, rate controls, suspension for certain operating conditions, and/or suspension in response to certain operator inputs. The described implementations of the inducement signal value 110 and engine derate value 112 are non-limiting examples.

Figure 2:
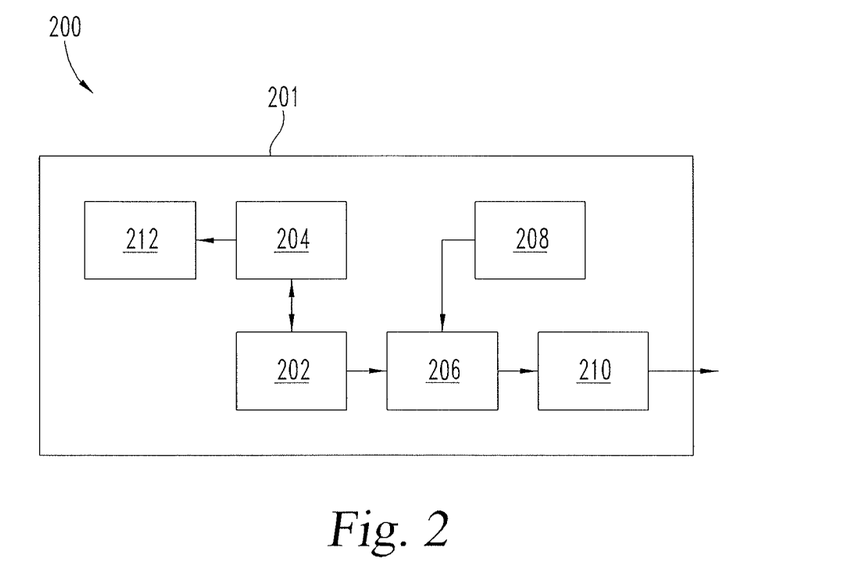
FIG. 2 is a schematic of a system including an engine, an SCR aftertreatment system, and a control system with which the system of FIG. 1 can be employed.

Referencing FIG. 2, a system 200 is illustrated schematically, having an application 201 and an engine 202 operationally coupled to the application 201. The application 201 includes any application utilizing an internal combustion engine, such as a diesel engine, and an SCR aftertreatment system. Examples of non-limiting applications include off-highway vehicles, pumps, generators, on-highway vehicles, and power take-off (PTO) applications that may provide shaft power to any device. In certain embodiments, the system 100 includes an application 201 that is not an on-highway vehicle. Off-road applications are also contemplated that have a wide range of different operating conditions. Off-road vehicle applications may or may not include a vehicle speed sensor.

The system 200 further includes an SCR catalyst 210, a DEF source or tank 208, and a DEF inlet 206. The DEF tank 208 is operationally coupled to an exhaust stream of the engine 202 at a position upstream of the SCR catalyst 210. Example DEF inlets 206 include a urea injector (liquid phase, gas phase, air assisted, etc.) and/or may include a decomposition tube and/or mixing features such as baffles, impact plates, and/or other mixing features.

The system 200 further includes a controller 204 structured to perform certain operations to provide compliance incentives for an SCR aftertreatment system. The system 200 further includes an operator interface device 212, which may facilitate inputs from or outputs to an operator or other devices in the system. Example and non-limiting operator interface devices 212 include one or more lamps, such as a MIL, a DEF lamp, a more generic lamp such as a "check engine" light; an audio output such as a buzzer, a datalink or network communication device, an interface to a computing device such as a service tool, laptop, or smart phone; an operator actuator input such as a signal representing an accelerator request, a torque or speed demand, or a dedicated actuator such as a "continue" button; and/or may include access to a software value stored on a non-transient computer readable storage medium representing an operator input or output.

In certain embodiments, the controller 204 forms a portion of a processing subsystem including one or more computing devices having memory, processing, and communication hardware. The controller 204 may be a single device or a distributed device, and the functions of the controller may be performed by hardware or software. The controller 204 may include ECM 102 such as illustrated in FIG. 1, in whole or part.

In certain embodiments, the controller 204 includes one or more modules structured to functionally execute the operations of the controller. In certain embodiments, the controller 204 includes a system state module 302, a DEF level module 304, a DEF quality module 306, and an incentive management module 308. The description herein including modules emphasizes the structural independence of the aspects of the controller 204, and illustrates one grouping of operations and responsibilities of the controller 204. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 3.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
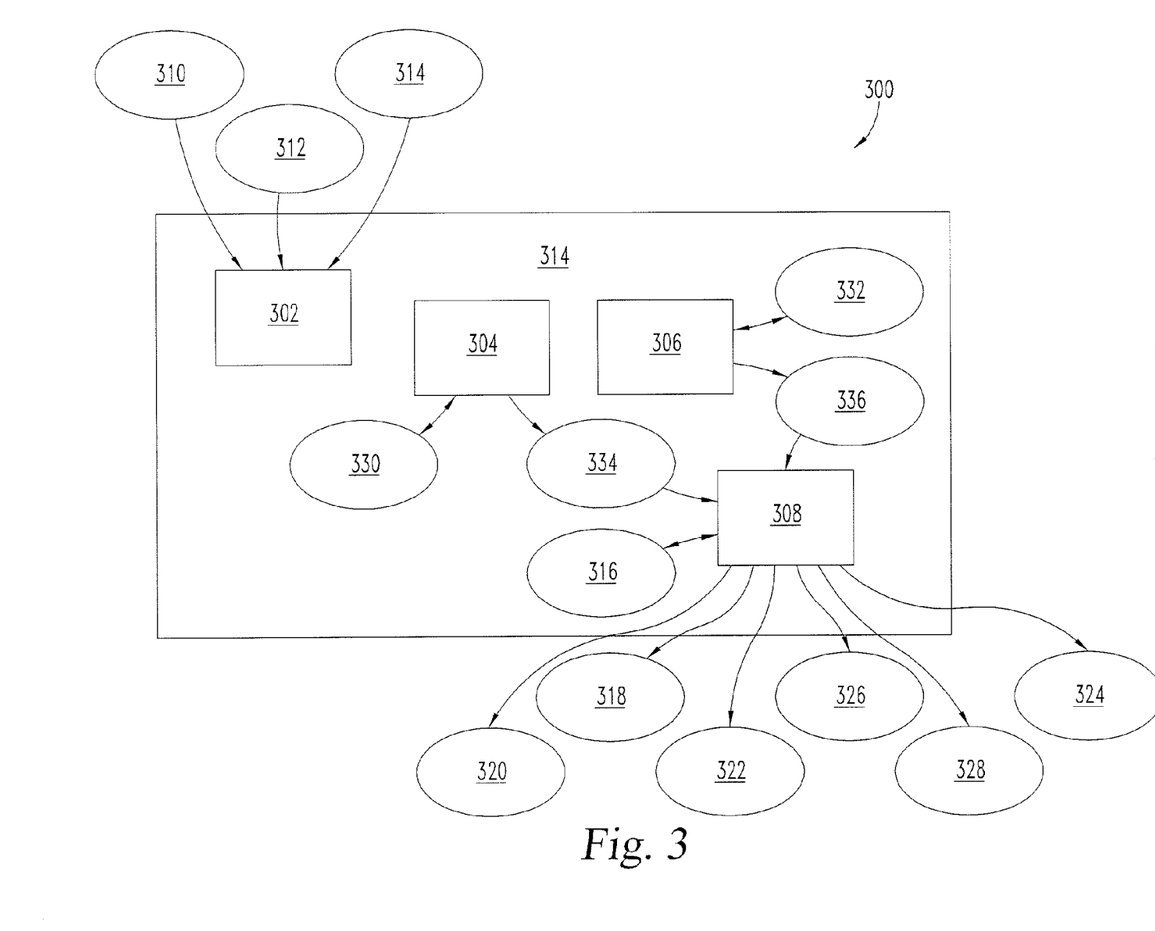
FIG. 3 is a schematic of a processing subsystem of a controller of the control system.

Referencing FIG. 3, a schematic illustration of a processing subsystem 300 including controller 204 is depicted. The controller 204 includes a system state module 302, a DEF level module 304, a DEF quality module 306, and an incentive management module 308. The system state module 302 interprets system state information utilized by the controller 204, for example a DEF level value or indication 310, a DEF quality value or indication 312, an aftertreatment system malfunction indication, and/or an operator input value 314 such as an override request.

The DEF level module 304 determines a DEF level inducement state or signal value 334 in response to the DEF level indication 310. The DEF level inducement signal value 334 may be an explicit inducement derate value (e.g. "initial derate") or may be a value from which the inducement derate value may be determined (e.g. low DEF is present, with a time since low DEF detection). The controller 204 includes the incentive management module 308 providing a torque derate value 322, a speed derate value 324, a fault code value 318, one or more output commands 320, an engine state command 326 (e.g. shutdown, idle, disable, etc.), and/or an override power schedule 328 in response to the DEF level inducement signal 334. In certain embodiments, the controller 204 includes one or more DEF level calibrations 330 available at run-time, which may be stored in non-volatile memory, read from a stored location, accessed over a datalink, etc., which may include DEF level indications 310 and/or times for DEF level indications 310 at which various inducement activities or stages are scheduled to occur.

The DEF quality module 306 determines a DEF quality inducement state or signal value 336 in response to the DEF quality indication 312. The DEF quality inducement signal value 336 may be an explicit incentive state value (e.g. "initial derate") or may be a value from which the incentive state value may be determined (e.g. poor DEF quality is present, with a time since poor DEF quality detection). The controller 204 includes the incentive management module 308 providing one or more of a torque derate 322, a speed derate 324, a fault code 318, one or more output commands 320, an engine state command 326 (e.g. shutdown, idle, disable, etc.), and/or an override power schedule 328 in response to the DEF quality inducement signal 336. In certain embodiments, the controller 204 includes one or more DEF quality calibrations 332 available at run-time, which may be stored in non-volatile memory, read from a stored location, accessed over a datalink, etc., which may include DEF quality indications 312 and/or times for DEF quality indications 312 at which various incentive activities are scheduled to occur.

In certain embodiments, the processing subsystem 300 provides a framework wherein any of the operations or procedures described herein may be implemented. Any of the operations or procedures may be implemented in any other manner understood in the art where applicable. A processing subsystem 300 may include any or all of the modules and data elements depicted in FIG. 3, and in certain embodiments a module or data element not depicted in FIG. 3 but otherwise described herein may be present.

Figure 4:
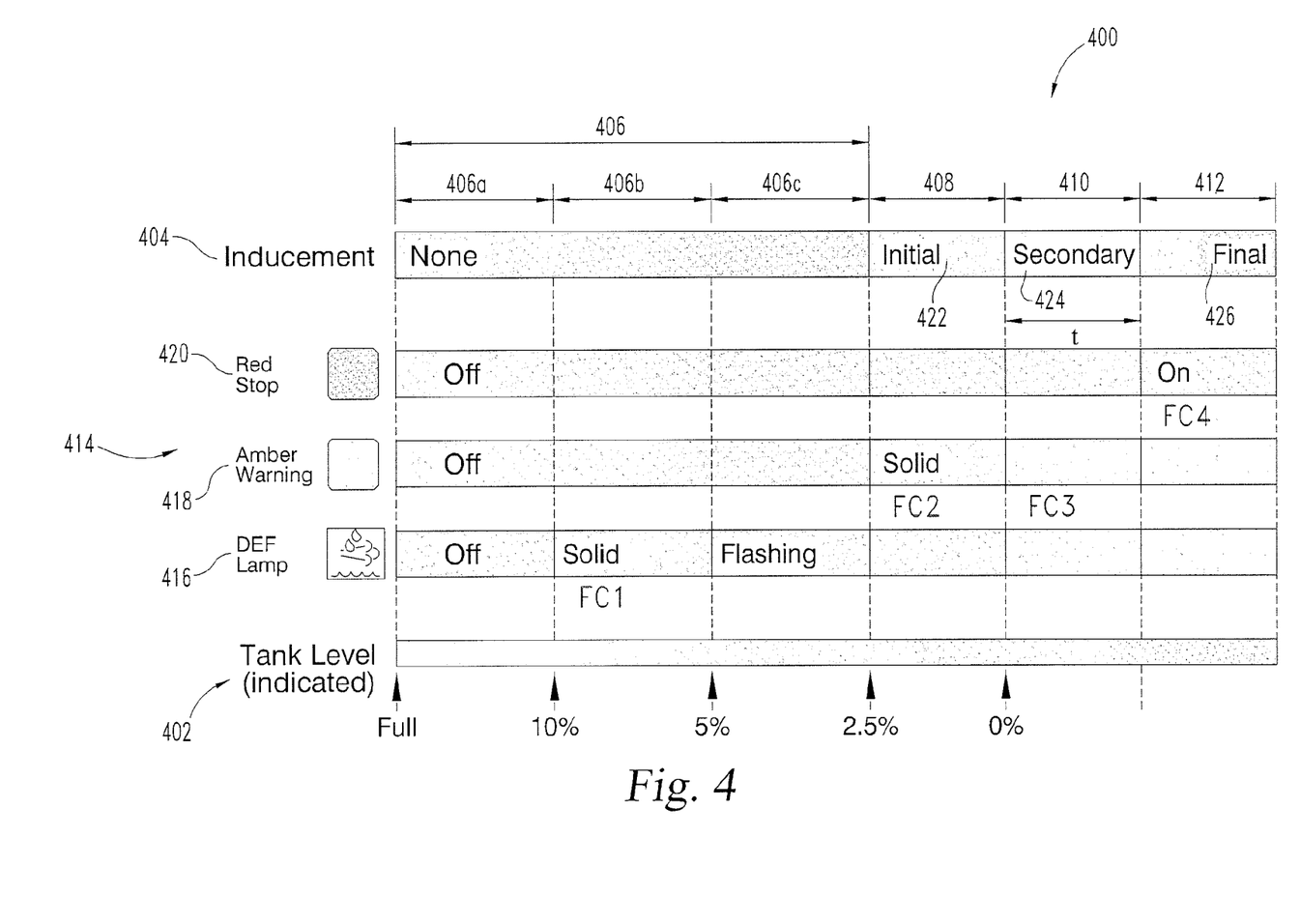
FIG. 4 is a diagram of one example of a maintenance inducement strategy based on DEF tank levels that can be implemented with the systems of FIGS. 1-3.

Referencing FIG. 4, an example incentive or inducement strategy for one embodiment of processing subsystem 300 is depicted in the form of a diagram 400. Diagram 400 includes a DEF tank level indicator 402 that is demarcated into various DEF tank level indications ranging from a full DEF tank to an empty (0%) DEF tank. An inducement or incentive schedule 404 is provided that sets forth that varying levels of inducements according to the DEF tank level indicator 402. The inducement period 404 includes a no inducement range 406, an initial inducement range 408, a secondary inducement range 410, and a final inducement range 412. No inducement range 406 includes three sub-ranges 406a, 406b, 406c in which information may be provided to the operator relating to the DEF tank level but no inducement or incentive is provided to the operator. Diagram 400 also depicts various output indicators 414 operably connected to controller 204 that can be activated to, for example, warn the operator, technician or other person that aftertreatment system maintenance is needed. Output indicators 414 can include, for example, a DEF fill lamp 416, an amber warning indicator 418, and a red stop indicator 420.

In one example strategy shown in diagram 400, the no inducement range 406 includes a no response sub-range 406a between a tank level 402 of FULL and a no response threshold, such as a 10% DEF tank level indication, where no inducement or information is required to be provided to the operator regarding the DEF tank fill level, and none of the lamps or other output indicators 414 in the system are activated. The 10% threshold selected herein is a non-limiting example, and the sizing of the DEF tank, regulatory requirements, DEF usage rate at a selected operating point (e.g. idle, nominal load, maximum load, etc.), or other factors known to one of skill in the art having the benefit of the disclosures herein may be utilized to set the no response threshold. Example and non-limiting threshold values include 2%, 5%, 15%, 20%, and 25%, it being understood that other values may be utilized.

The strategy further includes setting a response in a first warning sub-range 406b of the no inducement range 406. In the response for first warning sub-range 406b, a DEF fill lamp 416 is set to a solid "ON" state to provide a notification indicator in response to the DEF tank level 402 falling below the no response threshold value of, for example, 10%. A first fault code value FC1 can also be set when the no response threshold value is obtained. At a second no response threshold value, which in the example is 5% or one-half of the first no response threshold value, a second warning sub-range 406c is entered in which a second notification indicator is implemented, such as a flashing of the DEF fill lamp 416 in the example. Additionally or alternatively, an audible alarm or buzzer may be implemented for the second notification indicator. The use of a second warning sub-range 406c with a second no response threshold value and second notification indicator is optional and non-limiting. For example, a single warning sub-range may be used, or more than two warning sub-ranges may be used, during the no incentive range 406.

The inducement schedule 404 further includes an initial inducement range 408 that is initiated when DEF tank level indicator 402 reaches a third threshold value, such as 2.5% or one-half of the second threshold value indicated in the illustrated embodiment. The initial inducement range 408 includes enacting a third notification indicator such as amber warning 418 or other suitable indicator, such as a MIL or check engine light, in response to crossing the third threshold value. The third notification indicator, in the example strategy, can also include continuing the flashing of DEF fill lamp 416 and/or the audible alarm. In the example strategy, the third notification indicator can also include a fault code value FC2 that is distinct from the first fault code value FC1, although the second notification indicator may include a distinct fault code value, and/or the fault codes may be the same or not present in certain embodiments. The initial inducement range 408 further provides an inducement that includes an initial derate value 422. The initial derate value 422 may be any amount and type of derate of engine 202 selected by the implementer of the inducement strategy. Non-limiting examples include derating of the engine torque and/or speed, but may additionally or alternatively include any type of derate such as limiting engine responsiveness and/or prohibiting certain engine operating modes (e.g. PTO, Cruise, etc.).

The inducement schedule 404 further includes a secondary inducement range 410 that is initiated when DEF tank level indicator 402 reaches a fourth threshold value, such as 0% or an empty DEF level value in the illustrated embodiment. Secondary inducement range 410 initiates a fourth notification indicator in response to crossing the fourth threshold value. The fourth notification indicator, in the example strategy, includes continuing the flashing the DEF fill lamp 416 and/or audible alarm, and setting a third distinct fault code value FC3.

Secondary inducement range 410 also includes a secondary derate value 424 for engine 202. In the example, the secondary derate value 424 provides a derate value that is greater than the initial derate value 422 and less than a final derate value 426, as discussed further below. As used herein, a greater derate value provides a greater derate condition for the engine 202. The secondary derate value 424 may be implemented as a ramped derate, as a derate trajectory, and/or as a derate schedule. Additionally or alternatively, any of the initial derate value 422, secondary derate value 424, and/or final derate value 426 may likewise be implemented as a ramped derate, as a derate trajectory, and/or as a derate schedule. An example derate value including a ramped derate may be reducing engine torque or speed at a fixed rate per unit time, such as 1% per minute. Any other derate ramp or schedule is contemplated herein, including derate ramps and schedules having a non-linear implementation derate values and/or a stepwise derate values.

In the example inducement schedule 404, the secondary derate value 424 is applied for a time period t, such as 30 minutes or other suitable time limit, before the final incentive range 412 is initiated. The amount of time t is selectable, and may depend upon, without limitation, the amount of $NO_x$ emissions when the system is depleted of DEF, the emissions certification level of the engine, an estimate of appropriate shutdown times according to the application 201 of the installed engine, and/or a negotiated or reported value to a regulator (e.g. an emissions impact estimate provided to a regulator). Examples of non-limiting time values t for application of the secondary derate value 424 during secondary incentive range 410 and before the final incentive range 412 is initiated include 1 minute, 2 minutes, 5 minutes, 10 minutes, 15 minutes, 20 minutes, 45 minutes, 60 minutes, and 120 minutes.

In the example inducement schedule 404, a fifth notification indicator can be enacted when the selected amount of time t for the secondary incentive range 410 is elapsed. In the example, a red stop lamp 420 is set to a solid "ON" condition, another distinct fault code value FC4 is provided, and a final derate value 426 is implemented at the start of final incentive range 412. While three derate ranges are shown in the diagram 400, the number of derate ranges can be varied and is selectable. The final derate value 426, regardless of the number of previous derate values applied previously, can be any one or combination of a mission disabling derate value, an engine shutdown, a forced engine idle, or other severe derate, such as a "limp home" mode type of derate value. The final derate value 426 may also become more severe over time, such as beginning at a mission disabling derate value and progressing to a shutdown derate value over time.

In certain embodiments, for any one or all of the incentive ranges 406, 408, 410, 412, the lamps, audible notifications, and/or the fault code value notifications may be provided before the derate value is applied to the engine performance, and/or contemporaneous with the engine performance derate. An example strategy includes providing lamp or other operator visible notification for two minutes before the derate value is applied to the engine performance, although the example time is non-limiting. Audible alarms may be provided intermittently or for a shortened period of time.

Figure 5:
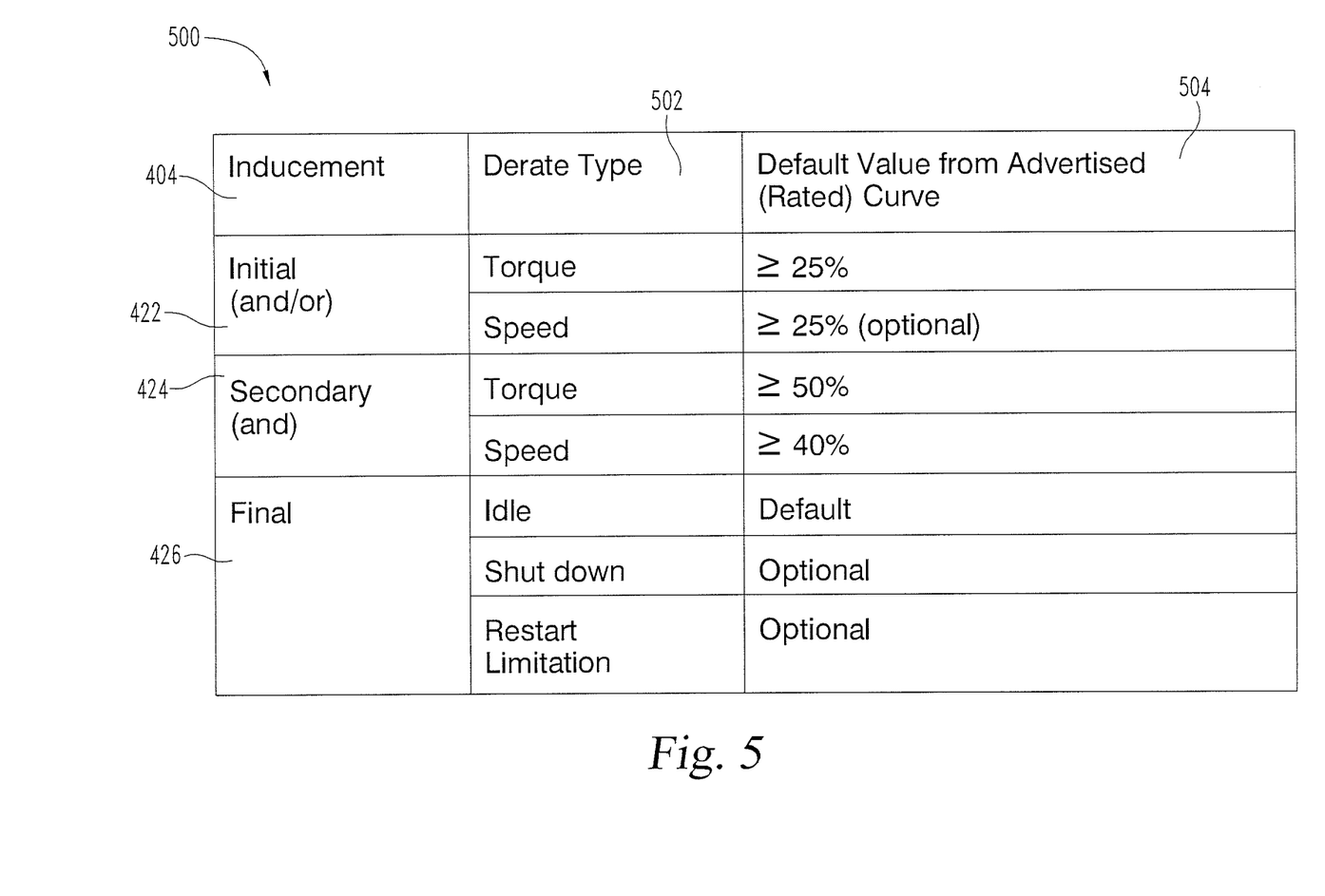
FIG. 5 is a table of one example inducement schedule of derate types and values for an example maintenance inducement strategy that can be implemented with the systems of FIGS. 1-3.

Referencing FIG. 5, a table 500 provides examples and non-limiting derate values for an inducement schedule of a given strategy implementation. Table 500 includes derate types 502 and default derate values 504 for each derate type 502. The specific default derate values 504 for a given embodiment may be a manufacturing calibration, adjustable by an OEM installing the engine into an application, adjustable by a fleet owner, adjustable by an owner/operator, and/or adjustable as part of a service or maintenance event. The adjustment scheme may additionally or alternatively include notification of an adjustment, utilization of a password protection scheme, or other scheme that limits or communicates adjustments to a third party. In one non-limiting example, a given family of engines may be certified for a first application of the engine to utilize a 20% initial derate value and a second application of the engine to utilize a 30% initial derate value. In the example, an owner of the engine sells the engine to another owner that installs the engine into the second application, and an arrangement is made through the OEM or engine manufacturer whereby the engine is recalibrated from the first application derate scheme to the second application derate scheme. The provided reasons for changing an application derate scheme after the time of manufacture are non-limiting, and any reason for changing the derate scheme is contemplated herein.

In the example of table 500 in FIG. 5, the initial derate value 422 is provided with derate types 502 for torque and speed, and default derate values 504 of 25% or greater for a torque derate and/or a 25% or greater engine speed limit for a speed derate. The initial derate value 422 may be ramped to the provided value or implemented in a step. The secondary derate value 424 is provided with derate types 502 for torque and speed, and default derate values 504 of 50% or greater for a torque derate and/or a 40% or greater for an engine speed limit derate. The final derate value 426 may be provided with a derate type 502 that includes a forced idle derate, a shutdown derate (i.e. total engine shutdown, perhaps enforced in a scheduled manner such as 30 seconds after a red lamp begins flashing), and/or a restart limitation derate. A restart limitation includes, for example, allowing the operator to restart the engine and operate the engine for a short period of time, where the number of such restarts may be limited to a specified number of times. The amount of engine operation allowed at each restart may be the same or a distinct value—such as 60 seconds on a first restart, 30 seconds on a second restart, etc. Each engine restart may be allowed for a sufficient period of time to check whether the DEF tank level has been filled, for example, and/or an engine restart may be total at some point in time (or after a specified number of restarts), requiring a service tool, maintenance operation, "pedal dance," prolonged key-on period, or other operation before an engine restart is permitted.

Figure 6:
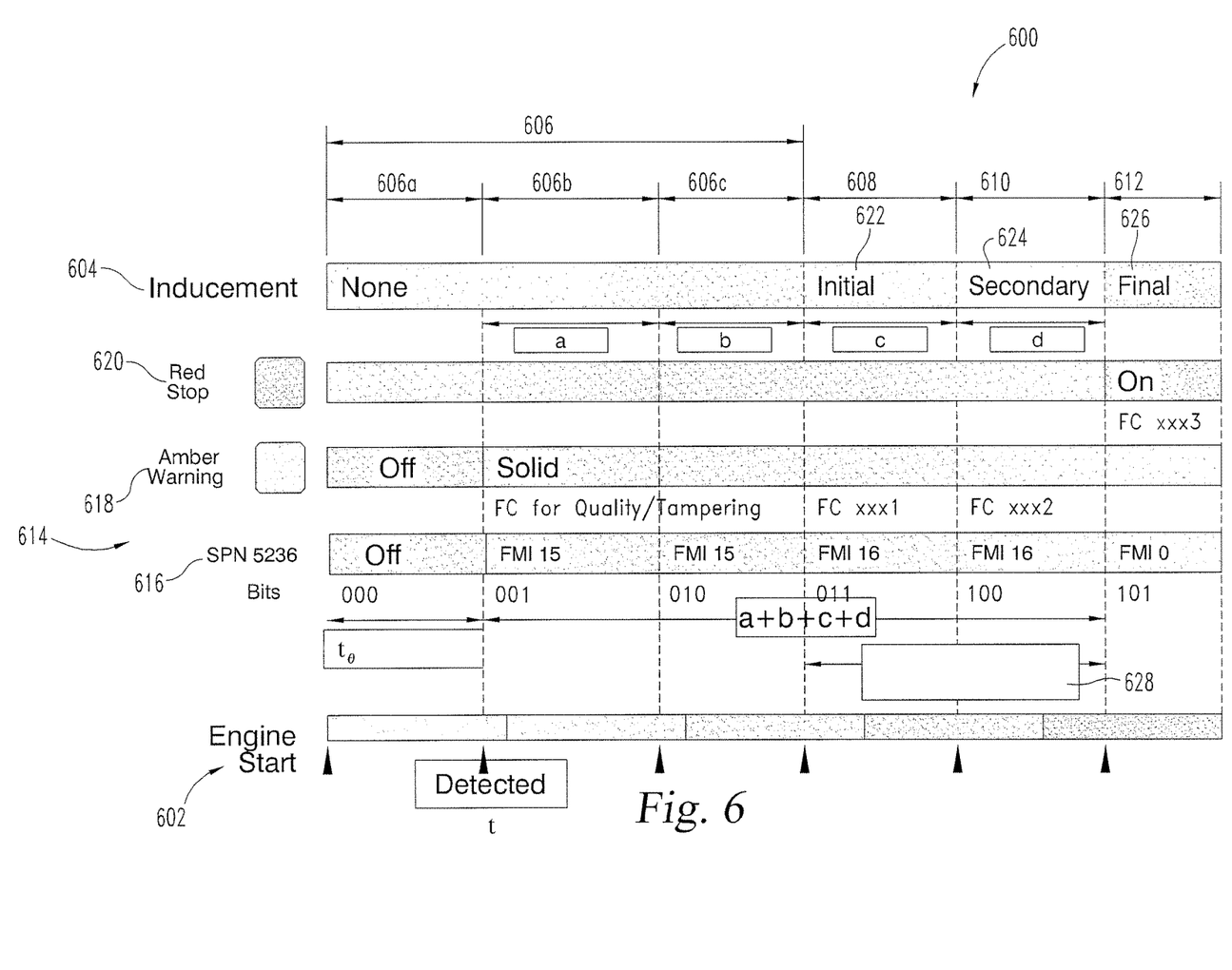
FIG. 6 is a diagram of another example of a maintenance inducement strategy based on DEF quality and/or aftertreatment system malfunction indication that can be implemented with the systems of FIGS. 1-3.

Referencing FIG. 6, an example inducement strategy relating to a DEF fluid quality indication and/or aftertreatment system malfunction indication for another embodiment of processing subsystem 300 is depicted in the form of a diagram 600. Diagram 600 includes an engine start time 602 during which DEF quality or SCR aftertreatment system is checked for a poor or malfunction indication. The engine start time 602 before "detection" of the indication is a time period $t_0$ that elapses before a DEF quality or aftertreatment malfunction indication check is initiated. In certain embodiments, $t_0$ is less than one half hour, less than one hour, or less than any suitable time interval to check for DEF quality and/or tampering issues. Detection may occur from a sensor, or from an algorithm that infers the DEF quality and/or system malfunction from other system parameters. Example operations for detection of aftertreatment system malfunction include determining one or more components of the aftertreatment system are operating improperly, that one or more components of the aftertreatment system have been tampered with, that a sensor value is operating outside a normal or rational operating range, that a sensor value fails to change or progress in an expected manner, and/or an electrical indication that a sensor is not connected to the system. Several implementations for detection of DEF quality and aftertreatment system malfunction indications are known in the art and are not described herein for purposes of brevity.

Diagram 600 also includes an inducement schedule 604 that includes a no inducement range 606, an initial inducement range 608, a secondary inducement range 610, and a final inducement range 612. No inducement range 606 includes three sub-ranges 606a, 606b, 606c in which information is provided to the operator but no inducement or incentive is provided. Diagram 600 also depicts various output indicators 614 operably connected to controller 204 that can be activated to, for example, warn the operator, technician or other person that aftertreatment system maintenance is needed. Output indicators 614 can include, for example, a DEF quality indicator 616, an amber warning indicator 618, and a red stop indicator 620.

In the example of FIG. 6, after detection of a DEF fluid quality and/or tampering issue at time t, inducement schedule 604 provides four time ranges (a, b, c, d) that are utilized to demarcate no-inducement sub-ranges 606b, 606c and inducement ranges 608, 610, 612 that provide for escalating inducements in response to the poor DEF quality indication and/or aftertreatment system malfunction indication. In certain embodiments, where greater resolution of the DEF quality is available rather than just pass/fail, the DEF quality value may be utilized and/or combined with a time since detection value to provide for a derate escalation index in a similar manner to that shown in FIG. 4. Additionally or alternatively, repeated poor DEF quality indications may invoke a more rapid derate escalation strategy than would occur at a given time since detection and/or fluid quality value.

During time period "a" after detection and indication of a DEF fluid quality and/or aftertreatment system malfunction issue at time t, a first no-inducement sub-range 606b is initiated that provides an amber warning lamp, an industry standard fault code (FMI 15 under SPN 5246), and/or may provide a proprietary or internal use fault code—for example as illustrated with the bit mask 001 during time period "a", and with the fault code represented by the FC for Quality. At time period "b", second no-inducement sub-range 606c is initiated in which the bit mask is updated to 010, which allows for tracking of event timing or other features that may be desired. At the time period "c", initial inducement range 608 includes an implementation of an initial derate value 622. At time period "c", the industry standard and proprietary fault codes are also adjusted in the example. At time period "d", secondary inducement range 610 includes an implementation of a secondary derate value 610 and fault codes are updated. Upon the expiration of time period "d", a final inducement range 612 is initiated and a final derate value 626 and red stop lamp indicator 620 are implemented, as well as a further update of fault codes.

In certain embodiments, a number of operator overrides 628 are allowed during the initial and secondary inducement ranges 608, 610. In certain embodiments, up to three derate overrides 628 of, for example, 30 minutes are allowed, in response to an operator override request, which may be initiated, for example, by pressing a button, making a torque request above a threshold value, or by any other desired operator input value. The number and length of time of each override period is pre-programmed by the implementer, and each one may or may not be the same length. Additionally or alternatively, engine operation under an operator override of a derate value may not be to the full capability of the engine (e.g. the "rated" values) but may include operation at a less significant but still present derate value. Further, the amount of derate applied during each override period may be varied. For example, two operator overrides may be permitted, one where the engine operates at a rated value, and the second one where 50% of the otherwise present derate value is applied during the override period. In certain embodiments, the operator is provided with unlimited derate overrides, although additionally the controller may track, log, or otherwise store the utilization of the derate overrides and the amount of operations performed thereunder.

An example set of rules for the timing values of a, b, c, and d are provided. The described rules are non-limiting examples. In one embodiment, time periods a and b are constant time periods greater than 0, and time periods c and d are constant time periods having a sum that is greater than or equal to 1.5 hours. The sum of time periods a and b is constant, and the sum of time periods c and d is constant. Furthermore, the total time period represented by the sum of time periods a, b, c, and d is less than or equal to 4 hours. One or more of the derate values 622, 624, 626 of the initial, secondary, and final inducement ranges 608, 610, 612 for the DEF fluid quality/aftertreatment system malfunction inducement strategy of diagram 600 may be the same as the corresponding derate values 422, 424, 426 of the initial, secondary, and final inducement ranges 408, 410, 412 of the DEF tank level inducement strategy discussed with respect to diagram 400 and table 500. In certain embodiments, the DEF fluid quality inducement strategy and the DEF tank level inducement strategy utilize distinct derate values.

Various aspects of the systems and methods disclosed herein are contemplated. According one aspect, a method for providing a selective catalytic reduction (SCR) system maintenance incentive is provided. The method includes interpreting at least one of a DEF tank level indication, a DEF quality indication, and an SCR aftertreatment system malfunction indication associated with at least one of a DEF tank and an aftertreatment system operationally coupled to an engine. The method also includes determining an inducement signal value when at least one of the DEF tank level indication, the DEF quality indication, and the SCR aftertreatment system malfunction indication obtains a threshold value. The method further includes derating the engine in response to the inducement signal value.

According to various embodiments of the method, the DEF tank level indication is a continuous DEF tank level indication; the DEF quality indication is a binary quality value; the threshold value for the DEF tank level indication is a threshold tank fill level and the inducement signal value is determined when the DEF tank level indication is below the threshold tank fill level; the threshold value for the DEF quality indication is an elapse of a predetermined amount of time since a poor DEF quality indication; and the threshold value for the SCR aftertreatment system is an elapse of a predetermined amount of time since the SCR aftertreatment system malfunction indication.

In another embodiment of the method, derating the engine includes utilizing an inducement schedule that includes an initial derate value, a secondary derate value, and a final derate value, and the derate value increases, in order, from the initial derate value to the secondary derate value to the final derate value. In one refinement of this embodiment, the initial derate value comprises at least one of a torque derate value and a speed derate value. In another refinement of this embodiment, the final derate value includes at least one of an engine shutdown operation, an engine forced idle operation, a limp-home mode, and a restart limitation. In a further refinement, the restart limitation includes limiting the engine to a predetermined number of restart events in response to the final derate value.

In another refinement of the above embodiment, at least one of the initial derate and the secondary derate comprises a ramped derate. In yet another refinement of the above embodiment, the method includes allowing at least one operator derate override during derating the engine. In a further refinement, the final derate value does not allow the operator derate override.

In another embodiment of the method, derating the engine further includes at least one of a ramped derate and a derate schedule. In one refinement, the ramped derate comprises a percentage derate per minute value. In a further refinement, the percentage derate per minute value is 1% per minute. In another embodiment, the method includes allowing at least one operator derate override during derating the engine.

In another embodiment of the method, determining the inducement signal value includes determining when the threshold value of the at least one of the DEF tank level indication, the DEF quality indication, and the SCR aftertreatment system malfunction indication obtains a first threshold value, a second threshold value, and a third threshold value. The embodiment also includes derating the engine by utilizing an inducement schedule that includes inducement signal values with an initial derate value at the first threshold value, a secondary derate value at the second threshold value, and a final derate value at the third threshold value that increase in an amount of derate, in order, from the initial derate value to the secondary derate value to the final derate value.

In a refinement of this embodiment, the first threshold value is a first time period since the DEF quality indication, the second threshold value is a second time period after the first time period, and the third threshold value is a third time period after the second time period. In a further refinement, the method includes providing a warning of poor DEF quality upon interpreting the DEF quality indication. In another refinement of this embodiment, the first threshold value is a first time period following the SCR aftertreatment system malfunction indication, the second threshold value is a second time period after the first time period, and the third threshold value is a third time period after the second time period. In a further refinement, the method includes providing a warning of SCR aftertreatment system malfunction upon interpreting the SCR aftertreatment malfunction indication.

In another refinement of the previous embodiment, the first threshold value is a first DEF tank level that is less than the DEF tank level indication, the second threshold value is a second DEF tank level that is less than the first DEF tank level, and the third threshold value is a time period after the DEF tank level indication reaches the second threshold value. In one refinement, the second DEF tank level corresponds to an empty DEF tank. In a further refinement, the time period ranges from about 2 minutes to one hour.

According to another aspect, a system includes an internal combustion engine including an exhaust system for receiving an exhaust gas produced by the internal combustion engine, an SCR aftertreatment system connected to the exhaust system for treating nitrous oxide emissions in the exhaust gas, and a DEF tank connected to the exhaust system to provide DEF to the SCR aftertreatment system. The system also includes at least one of a DEF level indicator configured to detect a level of DEF in the DEF tank, a DEF quality indicator configured to detect a quality of the DEF, and an SCR aftertreatment system indicator configured to detect an SCR system malfunction. The system also includes a controller configured to determine an inducement signal value in response to the at least one of the DEF level indicator, the DEF quality indicator, and the SCR aftertreatment system indicator obtaining a threshold value. The controller is also configured to derate the engine in response to the inducement signal value.

In one embodiment, the controller is configured to derate the engine according to an inducement schedule that includes an initial derate value, a secondary derate value, and a final derate value, wherein the derate value increases, in order, from the initial derate value to the secondary derate value to the final derate value. In one refinement, the initial derate value comprises at least one of a torque derate value and a speed derate value. In another refinement, the final derate value comprises at least one of an engine shutdown operation, an engine forced idle operation, a limp-home mode, and a restart limitation.

In another embodiment, the controller is configured to determine the inducement signal value when the threshold value of the at least one of the DEF tank level indicator, the DEF quality indicator, and the SCR aftertreatment system malfunction indicator obtains a first threshold value, a second threshold value, and a third threshold value. The controller is also configured to derate the engine according to an inducement schedule having inducement signal values that include an initial derate value at the first threshold value, a secondary derate value at the second threshold value, and a final derate value at the third threshold value that increase in an amount of derate, in order, from the initial derate value to the secondary derate value to the final derate value.

In one refinement of this embodiment, the first threshold value for the DEF quality indication is a first time period since the DEF quality indicator indicates a poor DEF quality, the second threshold value is a second time period after the first time period, and the third threshold value is a third time period after the second time period. In a further refinement, the controller is configured to provide a warning signal before the first time period upon indication of poor DEF quality.

In another refinement of the previous embodiment, the first threshold value for the SCR aftertreatment system malfunction indication is an elapse of a first time period since the SCR aftertreatment system malfunction indication, the second threshold value is an elapse of a second time period after the first time period, and the third threshold value is an elapse of a third time period after the second time period. In a further refinement, the controller is configured to provide a warning signal before the first time period upon indication of SCR aftertreatment system malfunction.

In another refinement of the previous embodiment, the first threshold value for the DEF tank level indication is a first DEF tank level, the second threshold value is a second DEF tank level that is less than the first DEF tank level, and the third threshold value is an elapse of a time period after the DEF tank level indication reaches the second threshold value. In a further refinement, the controller is configured to provide a warning signal before the DEF tank level indication obtains the first DEF tank level.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for providing a selective catalytic reduction (SCR) system maintenance incentive, comprising:
interpreting an SCR aftertreatment system malfunction indication associated with at least one of a DEF tank and an aftertreatment system operationally coupled to an engine;
determining an inducement signal value when the SCR aftertreatment system malfunction indication obtains a threshold value; and
derating the engine in response to the inducement signal value.

2. The method of claim 1, wherein the threshold value for the SCR aftertreatment system is an elapse of a predetermined amount of time since the SCR aftertreatment system malfunction indication.

3. The method of claim 1, wherein derating the engine comprises utilizing an inducement schedule that includes an initial derate value, a secondary derate value, and a final derate value, wherein the derate value increases, in order, from the initial derate value to the secondary derate value to the final derate value.

4. The method of claim 3, wherein the initial derate value comprises at least one of a torque derate value and a speed derate value.

5. The method of claim 3, wherein the final derate value comprises at least one of an engine shutdown operation, an engine forced idle operation, a limp-home mode, and a restart limitation.

6. The method of claim 5, wherein the restart limitation comprises limiting the engine to a predetermined number of restart events in response to the final derate value.

7. The method of claim 3, wherein at least one of the initial derate and the secondary derate comprises a ramped derate.

8. The method of claim 3, further comprising allowing at least one operator derate override during derating the engine.

9. The method of claim 8, wherein the final derate value does not allow the operator derate override.

10. The method of claim 1, wherein derating the engine further comprises at least one of a ramped derate and a derate schedule.

11. The method of claim 10, wherein the ramped derate comprises a percentage derate per minute value.

12. The method of claim 11, wherein the percentage derate per minute value is 1% per minute.

13. The method of claim 1, further comprising allowing at least one operator derate override during derating the engine.

14. The method of claim 1, further comprising:
interpreting at least one of a diesel exhaust fluid (DEF) tank level indication and a DEF quality indication; and
determining the inducement signal value when the SCR aftertreatment system malfunction indication and at least one of the DEF tank level indication and the DEF quality indication obtains the threshold value.

15. The method of claim 14, wherein the DEF tank level indication is a continuous DEF tank level indication.

16. The method of claim 14, wherein the DEF quality indication is a binary quality value.

17. The method of claim 14, wherein the threshold value for the DEF tank level indication is a threshold tank fill level and the inducement signal value is determined when the DEF tank level indication is below the threshold tank fill level.

18. The method of claim 14, wherein the threshold value for the DEF quality indication is an elapse of a predetermined amount of time since a poor DEF quality indication.

19. The method of claim 14, wherein:
determining the inducement signal value includes determining when the threshold value of the at least one of the DEF tank level indication, the DEF quality indication, and the SCR aftertreatment system malfunction indication obtains a first threshold value, a second threshold value, and a third threshold value; and
derating the engine includes utilizing an inducement schedule that includes inducement signal values with an initial derate value at the first threshold value, a secondary derate value at the second threshold value, and a final derate value at the third threshold value that increase in an amount of derate, in order, from the initial derate value to the secondary derate value to the final derate value.

20. The method of claim 19, wherein the first threshold value is a first time period since the DEF quality indication, the second threshold value is a second time period after the first time period, and the third threshold value is a third time period after the second time period.

21. The method of claim 20, further comprising providing a warning of poor DEF quality upon interpreting the DEF quality indication.

22. The method of claim 19, wherein the first threshold value is a first time period following the SCR aftertreatment system malfunction indication, the second threshold value is a second time period, after the first time period, and the third threshold value is a third time period after the second time period.

23. The method of claim 22, further comprising providing a warning of SCR aftertreatment system malfunction upon interpreting the SCR aftertreatment malfunction indication.

24. The method of claim 19, wherein the first threshold value is a first DEF tank level that is less than the DEF tank level indication, the second threshold value is a second DEF tank level that is less than the first DEF tank level, and the third threshold value is a time period after the DEF tank level indication reaches the second threshold value.

25. The method of claim 24, wherein the second DEF tank level corresponds to an empty DEF tank.

26. The method of claim 25, wherein the time period ranges from about 2 minutes to one hour.

27. A system, comprising:
an internal combustion engine including an exhaust system for receiving an exhaust gas produced by the internal combustion engine;
a selective catalytic reduction (SCR) aftertreatment system connected to the exhaust system for treating nitrous oxide emissions in the exhaust gas;
a diesel exhaust fluid (DEF) tank connected to the exhaust system to provide DEF to the SCR aftertreatment system;
an SCR aftertreatment system indicator configured to detect an SCR system malfunction; and
a controller configured to determine an inducement signal value in response to the at least one of the DEF level indicator, the DEF quality indicator, and the SCR aftertreatment system indicator obtaining a threshold value, the controller further being configured to derate the engine in response to the inducement signal value.

28. The system of claim 27, wherein the controller is configured to derate the engine according to an inducement schedule that includes an initial derate value, a secondary derate value, and a final derate value, wherein the derate value increases, in order, from the initial derate value to the secondary derate value to the final derate value.

29. The system of claim 27, wherein the initial derate value comprises at least one of a torque derate value and a speed derate value.

30. The system of claim 28, wherein the final derate value comprises at least one of an engine shutdown operation, an engine forced idle operation, a limp-home mode, and a restart limitation.

31. The system of claim 27, further comprising:
at least one of:
   a DEF level indicator configured to detect a level of DEF in the DEF tank; and
   a DEF quality indicator configured to detect a quality of the DEF, and
   wherein the controller is configured to determine the inducement signal value in response to the SCR aftertreatment system indicator and the at least one of the DEF level indicator and the DEF quality indicator obtaining the threshold value.

32. The system of claim 31, wherein the controller is configured to determine the inducement signal value when the threshold value of the at least one of the DEF tank level indicator, the DEF quality indicator, and the SCR aftertreatment system malfunction indicator obtains a first threshold value, a second threshold value, and a third threshold value, the controller further being configured to derate the engine according to an inducement schedule having inducement signal values that include an initial derate value at the first threshold value, a secondary derate value at the second threshold value, and a final derate value at the third threshold value that increase in an amount of derate in order, from the initial derate value to the secondary derate value to the final derate value.

33. The system of claim 32, wherein the first threshold value for the DEF quality indication is a first time period since the DEF quality indicator indicates a poor DEF quality, the second threshold value is a second time period after the first time period, and the third threshold value is a third time period after the second time period.

34. The system of claim 33, wherein the controller is configured to provide a warning signal before the first time period upon indication of poor DEF quality.

35. The system of claim 32, wherein the first threshold value for the SCR aftertreatment system malfunction indication is an elapse of a first time period since the SCR aftertreatment system malfunction indication, the second threshold value is an elapse of a second time period after the first time period, and the third threshold value is an elapse of a third time period after the second time period.

36. The system of claim 35, wherein the controller is configured to provide a warning signal before the first time period upon indication of SCR aftertreatment system malfunction.

37. The system of claim 32, wherein the first threshold value for the DEF tank level indication is a first DEF tank level, the second threshold value is a second DEF tank level that is less than the first DEF tank level, and the third threshold value is an elapse of a time period after the DEF tank level indication reaches the second threshold value.

38. The system of claim 37, wherein the controller is configured to provide a warning signal before the DEF tank level indication obtains the first DEF tank level.

* * * * *